United States Patent [19]

Hensen

[11] Patent Number: 4,487,444
[45] Date of Patent: Dec. 11, 1984

[54] REINFORCING INSERT FOR HOSE END SEGMENT

[76] Inventor: William L. Hensen, 3360 Patricks Point Dr., Trinidad, Calif. 95570

[21] Appl. No.: 412,231

[22] Filed: Aug. 27, 1982

[51] Int. Cl.³ .............................................. F16L 13/04
[52] U.S. Cl. .................................... 285/114; 285/354; 285/379
[58] Field of Search ............... 285/114, 115, 116, 379, 285/380, 8, 354, 239, 240

[56] References Cited

U.S. PATENT DOCUMENTS

| | | | |
|---|---|---|---|
| 503,344 | 8/1893 | Fletcher | 285/379 X |
| 763,175 | 6/1904 | Gold | 285/379 |
| 790,971 | 5/1905 | Nicholls | 285/115 |
| 1,137,382 | 4/1915 | Calvert | 285/379 X |
| 2,109,522 | 3/1938 | Boyle | 285/379 |
| 2,608,421 | 8/1952 | Schnepp | 285/239 X |
| 3,333,871 | 8/1967 | Abbiati et al. | 285/114 X |
| 3,807,773 | 4/1974 | Brune | 285/354 X |
| 3,881,754 | 5/1975 | Christie | 285/114 |

Primary Examiner—Dave W. Arola
Attorney, Agent, or Firm—James D. Givnan, Jr.

[57] ABSTRACT

A flexible spiral spring insert for a hose end segment is disclosed which insert includes an enlarged end portion for retentive engagement with a coupling component on the hose end. The enlarged end portion may be a ring-shaped retainer chamferred about its outer periphery to avoid interference with seating of a nozzle rim with the washer of the coupling assembly. A modified form of the invention discloses an enlarged conical extension formed on one end of the flexible spiral spring insert while a still further modification includes a radially enlarged end coil of the insert with the coil adapted for washer engagement. The washer may be modified to be internally recessed to receive a radially expanded end coil of the spring to confine the spring against axial displacement.

2 Claims, 7 Drawing Figures

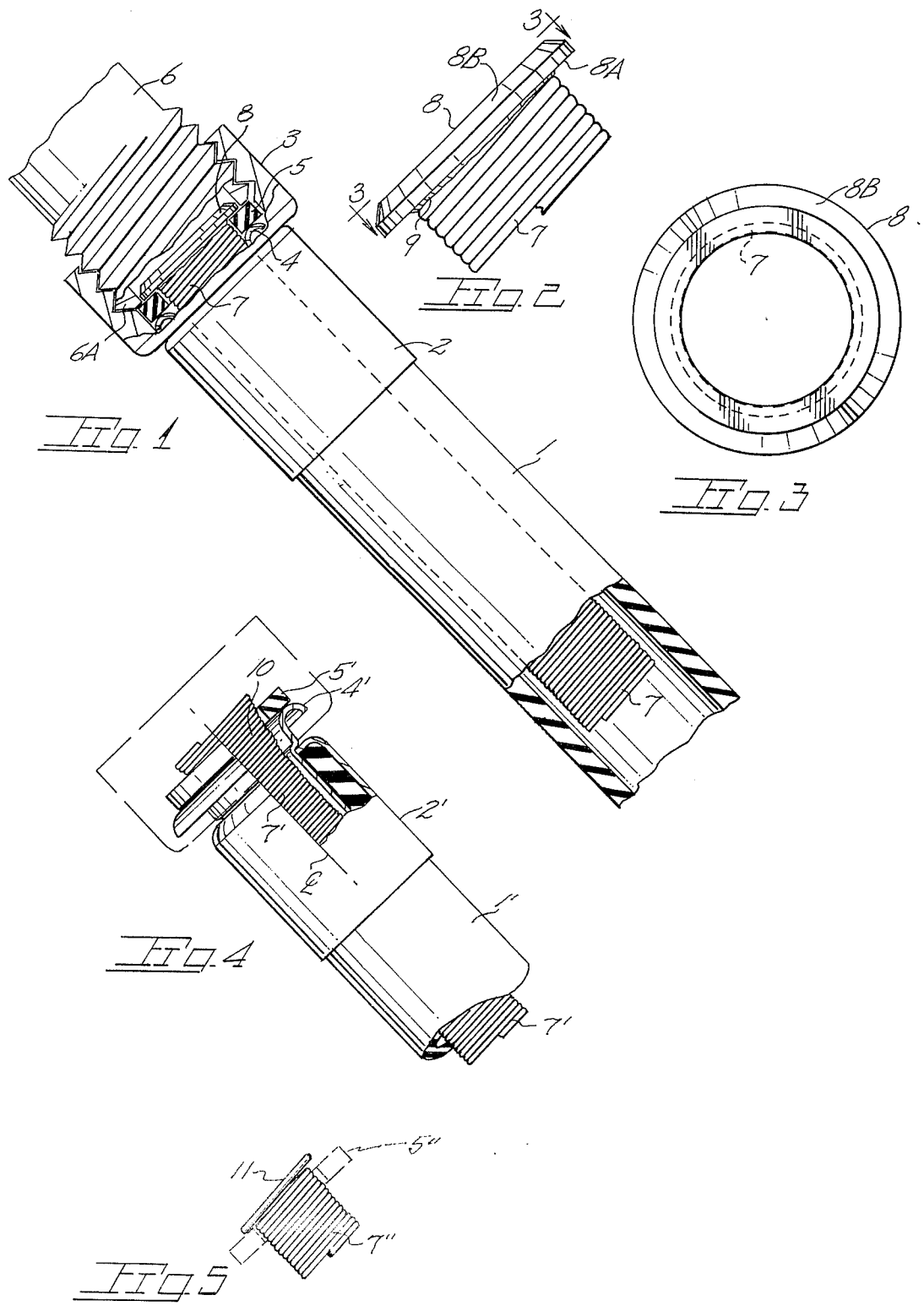

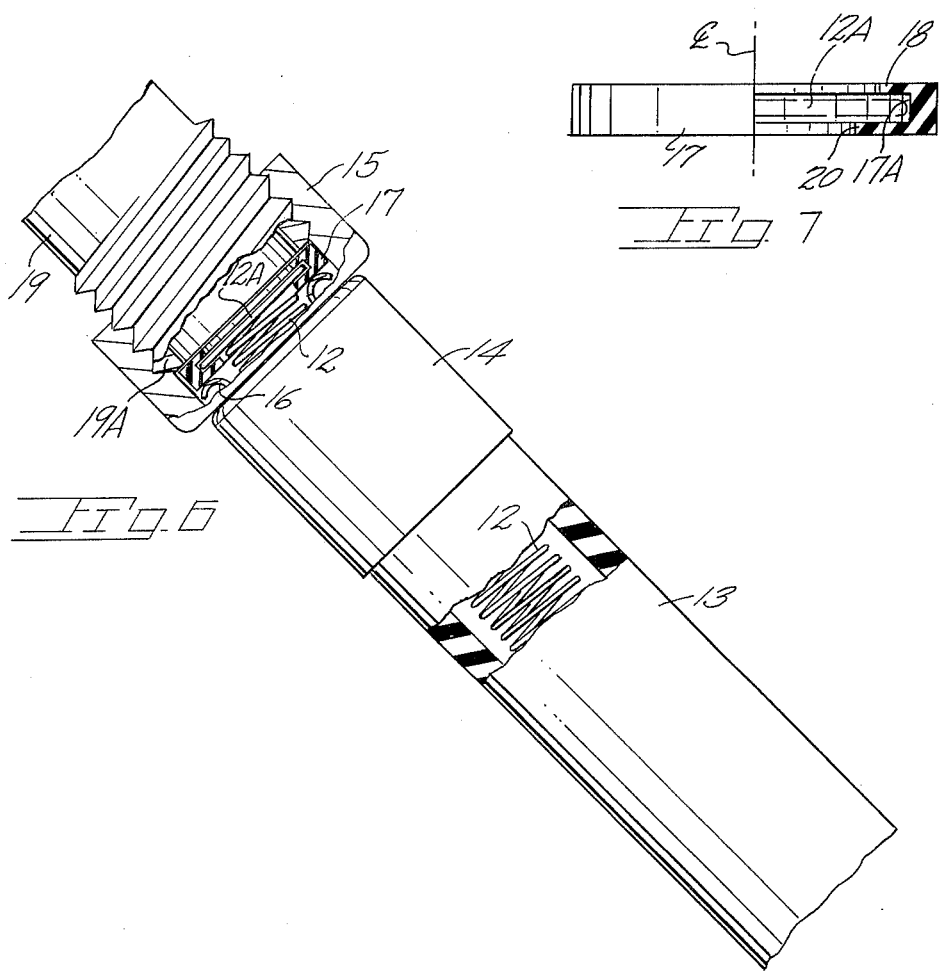

REINFORCING INSERRT FOR HOSE END SEGMENT

BACKGROUND OF THE INVENTION

The present application is a continuation-in-part of my earlier filed copending U.S. application, Ser. No. 06/252,332 filed Apr. 9, 1981 and bearing the same title and now abandoned.

The present invention pertains generally to tubular inserts for placement within hose end segments for the purpose of reinforcing same against collapse.

That end segment of a garden hose attached to the stationary nozzle of a faucet is subjected to wear and tear when the hose is tensioned resulting in premature failure of the hose adjacent the end coupling. A rupture in the hose wall at this point results in loss of the hose or at least repair of the hose which entails cutting off of the end segment and reinstallation of the coupling on the newly formed end. Most commonly, the failure of a hose end segment is due to kinking or collapsing of the hose wall.

The known prior art discloses various coiled structures in place within hoses for the purpose of imparting a degree of rigidity to the hose such as the coil arrangement disclosed in U.S. Pat. Nos. 3,272,535; 3,610,289 and 3,889,717. From the foregoing it will be obvious that the concept of reinforcing a flexible hose wall by means of a metallic coiled element is admittedly old.

SUMMARY OF THE PRESENT INVENTION

The present invention is embodied within an insertable member for placement within a hose and having an end retained in proximity to the washer in place within the hose coupling.

A main body portion of the present insert occupies an end segment of the hose and reinforces same against collapse or kinking when the hose is tentioned. One end of the insert is adapted to engage a component of the coupling to limit inward positioning of the insert. A washer component of the insert may be recessed about its inner periphery to engage an enlarged end coil of the spring component to confine same against axial movement.

Important objects of the present invention include the provision of an insert for garden hoses and the like which insert is removably mounted within the hose end to permit user installation without risk of interference with the watertight coupling; the provision of a hose insert having an enlarged end for seated engagement with a washer element of the coupling; the provision of a tubular insert for reinforcing that portion of a hose proximate the hose coupling; the provision of a hose insert lending itself to economical manufacture and packaging with installation by the consumer without the use of tools.

BRIEF DESCRIPTION OF THE DRAWING

In the accompanying drawing:

FIG. 1 is a side elevational view of a hose segment coupled to the nozzle of a water faucet;

FIG. 2 is an enlarged fragmentary view of one end of the hose insert shown in FIG. 1;

FIG. 3 is a plan view of FIG. 2 taken along line 3—3 thereof;

FIG. 4 is a view similar to FIG. 1 but showing a modified hose insert;

FIG. 5 is still another modified hose insert having an enlarged end; and

FIG. 6 is a view similar to FIG. 1 but showing still another form of the invention.

FIG. 7 is an elevational view of a modified washer.

DETAILED DESCRIPTION OF THE PREFERRED EMBODIMENT

With continuing attention to the drawing wherein applied reference numerals indicate parts similarly hereinafter identified, the reference numeral 1 indicates an end segment of a flexible conduit such as a garden hose. Secured in the conventional manner to the end of the hose is a ferrule 2 which constitutes part of a hose coupling. The conventional coupling includes a threaded collar 3 rotatably confined on the outer end of ferrule 2 by means of an outwardly flared flange 4 integral with an internal component of the coupling. A washer 5 is supported in place on flange 4 all in the conventional manner of garden hose couplings. The coupling above described is intended to be generally typical of conventional hose couplings. Threaded attachment of collar 3 to a faucet nozzle at 6 results in seating of the washer against the nozzle end in a wateright manner.

The insert shown in FIGS. 1 through 3 includes a coiled wire main body at 7 several inches in length and of a diameter permitting insertion into the hose end segment past the above mentioned coupling component. Main body member 7 may be of contiguous coiled construction or somewhat expanded construction wherein the coils are spaced from one another.

Secured as by soldering at 9 to the outermost end of the insert is an annular retainer 8 of slightly greater diameter than the main body to provide a shoulder 8A for seated engagement with a coupling component. Importantly, retainer 8 is chamferred at 8B to provide an inclined surface which may coact with the nozzle end to assure centering of the retainer in axial alignment with the nozzle end to thereby avoid interference with washer and nozzle seating. When operatively disposed within a coupling insert retainer 8 is disposed somewhat within the nozzle end indicated at 6A.

With particular attention to FIG. 4, a modified insert 7' extends somewhat outwardly past a washer element at 5' with the retainer of the spring type insert being in the shape of a truncated conical extension 10 of the spring the outside diameter of which is such as to engage the inner periphery of washer 5'. As before, the insert end, when in place within a hose coupling, is disposed proximate the nozzle end but does not interfere with the seating of the nozzle rim against washer 5'. Structure analogous to earlier described hose structure is identified with prime reference numerals.

A still further modified form of the invention is shown in FIG. 5 wherein an end coil 11 of an insert 7" is radially expanded so as to engage the uppermost annular surface of the washer at 5".

With attention to a still further modified form of the invention as viewed in FIG. 6, a helical spring 12 is shown inserted within a hose end segment 13. The hose end is fitted with a ferrule 14 which may be of conventional construction which rotatably mounts an internally threaded coupling 15 in the usual manner by means of a flange 16 of the ferrule.

A washer 17 defines an annular recess 17A extending about its inner periphery. An outer washer flange at 18 receives the nozzle end 19A of a faucet nozzle 19 while an inner flange at 20 is for abutment with ferrule flange 16. The annular washer flanges 18 and 20 cooperate to trap a radially enlarged end coil 12A of spring 12 which is seated within the washer recess during insert assembly. The end coil of the spring is radially expanded during coil manufacture to a size so as to fit snugly within and about the washer recess. This latter form of the invention may be considered the preferred embodiment partially for the reasons that the spring and washer may be readily assembled by hand for later insertion as a unit by the consumer into the hose end with the washer thereafter serving in the usual manner and also as a limit stop to restrain the spring against accidental separation from the hose end. The washer 17 is of a size to fit in the usual snug manner within the coupling.

The present insert is conveniently insertable within a hose end and removed without any special tools or mechanical knowledge on the user's part.

Removal of the insert from a hose end is rendered convenient by reason of the insert end at all times being located proximate the coupling washer. Accordingly, removal of the insert may be by fingertip effort or a common blade type screwdriver.

In use, the spiral spring type insert prevents collapsing of the hose end segment even when the hose is accidentally pulled too strenuously. Further, the prevention of hose kinking keeps the hose from rupturing at the point of ferrule attachment.

While I have shown but a few embodiments of the invention it will be apparent to those skilled in the art that the invention may be embodied still otherwise without departing from the spirit and scope of the invention.

Having thus described the invention, what is desired to be secured under a Letters Patent is:

1. A tubular insert for placement within and reinforcing a coupling equipped end segment of a flexible conduit, said insert comprising, a helical spring having a radially enlarged coil at one end of the spring of greater diameter than the remaining coils of the spring, and a resilient washer defining an annular recess formed within its inner periphery and within which is received said coil, said washer adapted to abut a portion of the conduit coupling to provide a fluid seal in the conventional manner while additionally securing the helical spring against axial displacement within said end segment of the conduit.

2. The insert claimed in claim 1 wherein said washer includes annular flanges of unlike radial width.

* * * * *